United States Patent [19]
Ghoshal

[11] Patent Number: 6,011,441
[45] Date of Patent: Jan. 4, 2000

[54] CLOCK DISTRIBUTION LOAD BUFFER FOR AN INTEGRATED CIRCUIT

[75] Inventor: Uttam Shyamalindu Ghoshal, Austin, Tex.

[73] Assignee: International Business Machines Corporation, Armonk, N.Y.

[21] Appl. No.: 09/067,149

[22] Filed: Apr. 27, 1998

[51] Int. Cl.[7] .................................................. G06F 1/12
[52] U.S. Cl. ........................... 331/55; 331/56; 331/75; 327/144; 327/147; 327/295; 327/297
[58] Field of Search .................................. 331/55, 56, 74, 331/75; 327/141, 144, 147, 295, 297

[56] References Cited

U.S. PATENT DOCUMENTS

| | | |
|---|---|---|
| 3,715,693 | 2/1973 | Fletcher et al. . |
| 3,736,517 | 5/1973 | Lim . |
| 3,769,603 | 10/1973 | Herchner . |
| 3,818,359 | 6/1974 | Hekimian . |
| 3,835,399 | 9/1974 | Holmes . |
| 3,921,102 | 11/1975 | Voorman et al. . |
| 4,245,202 | 1/1981 | Huntley . |
| 4,521,702 | 6/1985 | Kleinberg . |
| 4,760,353 | 7/1988 | Perkins . |
| 5,850,150 | 12/1998 | Mitra et al. .............................. 327/297 |
| 5,859,550 | 1/1999 | Brandt ..................................... 327/156 |

*Primary Examiner*—Siegfried H. Grimm
*Attorney, Agent, or Firm*—Casimer K. Salys; Andrew J. Dillon

[57] ABSTRACT

A system for synchronizing circuit operation within an integrated circuit having a high frequency clock. The system includes an oscillator for providing a clock signal and a transmission line coupled to the oscillator for distributing the clock signal to load buffers. The load buffers provide sub-circuits within the integrated circuit with synchronized clock signals. The load buffers are resonant and convert the capacitive load impedance of receiving circuits into a virtual inductive load. The impedance converter boosts the clock signal transition times to provide improved high frequency circuit synchronization within the integrated circuit.

16 Claims, 2 Drawing Sheets

CLOCK DISTRIBUTION LOAD BUFFER FOR AN INTEGRATED CIRCUIT

BACKGROUND OF THE INVENTION

1. Technical Field

The present invention relates in general to clock signal distribution within an integrated circuit and in particular, to a high speed buffer for enhancing clock signal distribution. Still more particularly, the present invention relates to a high speed resonant buffer for providing high speed clock signal distribution within an integrated circuit.

2. Description of the Related Art

Synchronization of logic circuits within an integrated circuit is accomplished by distributing a master clock signal to timing critical sub-circuits. The proper operation of an information processing unit, such as a microprocessor, requires that digital data is in the proper state when data is transferred by the clock signal. In all "clocked" systems there is a master clock which synchronizes circuits and controls the transfer of data.

Typically, an oscillator within an integrated circuit produces a clock signal and a central buffer amplifies the signal for distribution to digital sub-circuits. Interconnection of sub-circuits which are not adjacent on an integrated circuit substrate requires relatively long conductors to be fabricated on the integrated circuit. Integrated circuits are becoming larger and the distance separating sub-circuits is increasing. When the distance from a driving transistor within a central buffer to a receiving transistor of a sub-circuit becomes long enough to adversely effect a signal's characteristics and propagation time, the interconnecting wire can be referred to as a "long wire".

The resistance (R) of a wire increases linearly as a function of wire length (l) and, the resistance per unit length (r) of the material utilized, where R=rl. Likewise, the capacitance of a wire (C) increases linearly with its length (l) and capacitance per unit length (c). Capacitance can be defined by C=cl. The "R-C" delay (D) of a wire due to resistance and capacitances is $D=(½)rcl^2$.

As depicted above by the $l^2$ term, the delay due to the capacitive and resistive effects increases quadratically with the length of a wire. As clock speeds and the scale of integrated circuits continues to increase, timing difficulties associated with wire lengths have become a vexing problem.

Consumer demand for faster processing and higher clock frequencies has intensified the effort to find a solution for synchronization problems associated with clock signal distribution in the frequency range of one gigahertz.

The R-C delay associated with circuit interconnection is prone to process variations across the chip because the product (R-C) depends on the thickness of the conductor and the fabrication of the dielectric layers. Process variations result in intolerable timing skews in separate geographical areas of the integrated circuit. Unacceptable delay, bandwidth, and process tolerance due to R-C networks have forced circuit designers to create improved transmission line clock distribution circuits for digital circuits operating at gigahertz frequencies. The propagation delay in transmission lines is dependent only on the velocity of light in the dielectric medium surrounding the interconnects, delay is thus independent of the geometry of the interconnects and immune to variations resulting from fabrication processes. Transmission line circuits also exploit the inductive overshoot effects which result in sharp clock rise times that are critical for achieving fast response in digital latches and registers.

Transmission line distribution circuits originating from a central buffer form a "tree structure." A tree structure distributes clock signals to "load buffers" via "intermediate buffers". Intermediate buffers are optional and are deployed to maintain signal integrity. In typical microprocessor designs, each load buffer drives a capacitive load of about 1 nF. The 1 nF capacitance represents the input capacitance of load subcircuits, latches, and registers. The characteristic impedance of transmission lines is of the order of 50 ohms.

In order to attain clock signal rise times of less than 100 picoseconds (i.e. 10% of the clock period), the input capacitance of the load buffers has to be less than 2 picofarads. In conventional designs, buffers are cascaded to comprise a chain of inverters. Typically, a driving inverter supplies a receiving inverter and the receiving inverter is about three times larger in size than the driving inverter.

The scaling factor of three (i.e., =2.718 to be exact) results in optimal delay and acceptable clock signal rise times. Typically, the number of stages of load buffers in a clock distribution system is on the order of $\log_e (C_{load}/C_{input})$ or 6 buffers. The large number of inverts utilized as load buffers causes timing skews due to across chip channel length variations, increased chip area, and constraints in chip layout and planning. The output resistance of the last inverter stage in the load buffer must necessarily be less than 0.1 ohms in order to attain clock signal rise times of less than 100 ps for 1 nF load capacitances. Such low impedances result in large current transients (~10 A) during clock signal transitions, and high instantaneous currents create many problems in the power distribution network.

It should therefore be apparent that it would be advantageous to provide an integrated circuit clock distribution system which distributes an acceptable clock signal at very high clock speeds and requires a minimal quantity of buffers. Additionally, it would be advantageous to provide a clock distribution system which functions effectively with small buffers.

SUMMARY OF THE INVENTION

It is therefore one object of the present invention to provide improved clock signal distribution within an integrated circuit.

It is another object of the present invention to provide a high speed buffer for enhancing clock signal distribution.

It is yet another object of the present invention to provide a high speed resonant buffer for high speed clock signal distribution within an integrated circuit.

The foregoing objects are achieved as is now described. A system for synchronizing circuit operation within an integrated circuit having a high frequency clock is provided. The system includes an oscillator for providing a clock signal and a transmission line coupled to the oscillator for distributing the clock signal to load buffers. The load buffers provide sub-circuits within the integrated circuit with synchronized clock signals. The load buffers are resonant and convert the capacitive load impedance of receiving circuits into a virtual inductive load. The impedance converter boosts the clock signal transition times to provide improved high frequency circuit synchronization within the integrated circuit.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
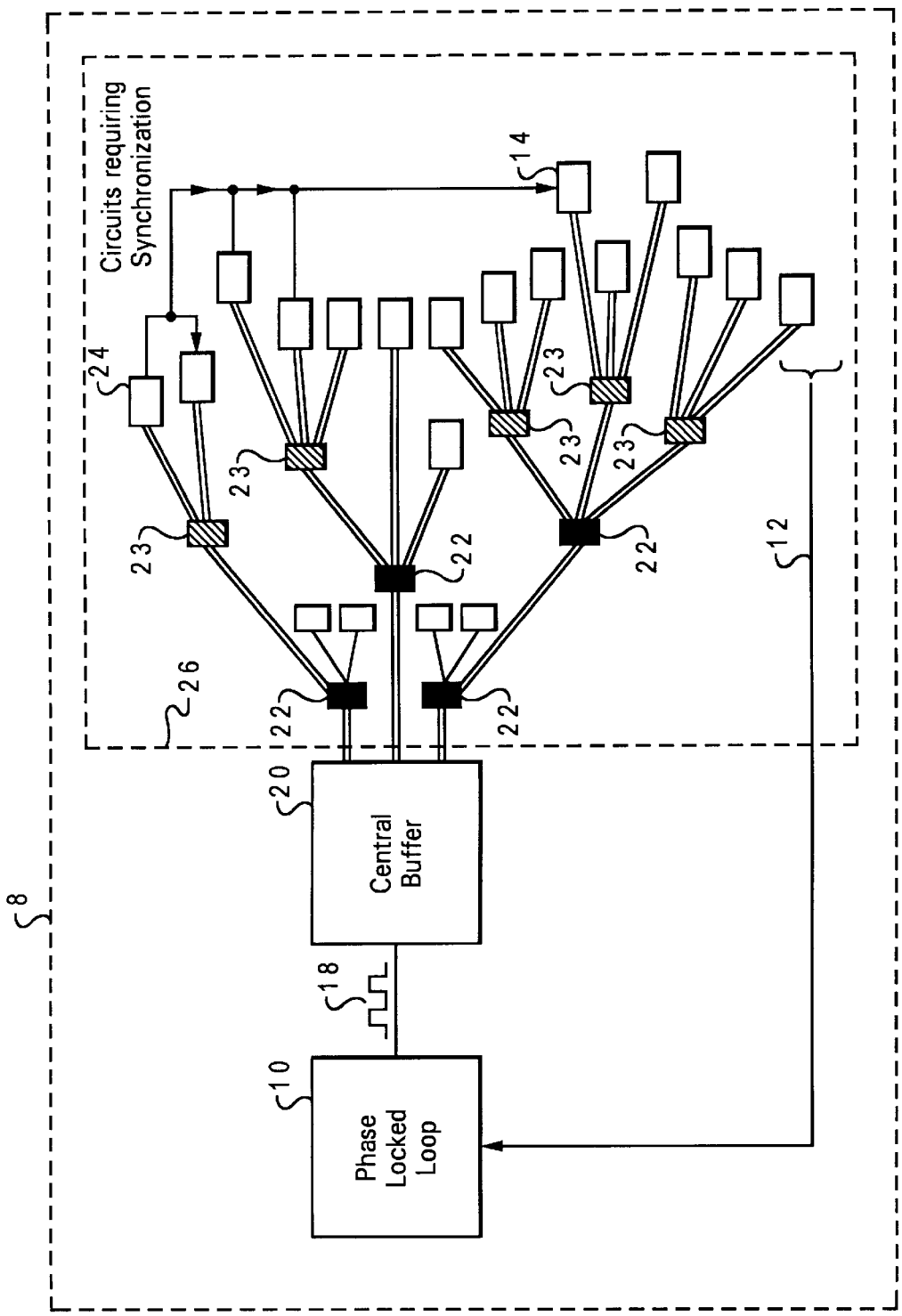
FIG. 1 illustrates a basic integrated circuit clock distribution system in accordance with the present invention.

With reference now to the figures and in particular with reference to FIG. 1, there is depicted a clock signal distribution system utilizing a transmission line network 26. Transmission line network 26 conducts clock signal 18 throughout integrated circuit 8.

Typically, a precision oscillator, such as a phase locked loop 10, is utilized within integrated circuit 8 to provide a stable clock signal 18 for the synchronization of data transfer. Phase locked loop 10 provides central buffer 20 with clock signal 18. Phase locked loop 10 produces clock signal 18 which has a low level and must be amplified and conditioned by central buffer 20 before distribution to sub-circuits to ensure system integrity.

Phase locked loop 10 receives feedback via sense line 12. Feedback ensures proper precision of clock signal 18 at receiving subcircuits. Many circuits and topologies could provide a precision clock signal for utilization in conjunction with the present invention. Phase locked loop 10 of FIG. 1 is only one such implementation.

Transmission line network 26 distributes the output of central buffer 20 to intermediate buffers 22. Intermediate buffers 22 "re-power" the clock signal and provide a strong signal to impedance converters 23. Impedance converters 23 replace the load buffers that are used in conventional designs. The fanout topology of transmission line network 26 has inherent detrimental loading effects on the clock signal output of central buffer 20. Typically, without intermediate buffers 22, a clock signal becomes distorted and timing skew will not allow integrated circuit 8 to properly operate at high clock speeds.

Timing abnormalities can "lock up" an entire computer system rendering the computer system unresponsive to all input. Many sub-circuits, such as sub-circuit 14, require synchronization to properly operate in conjunction with other sub-circuits. Particularly, synchronization is critical when data must be transferred among sub-circuits.

Each sub-circuit which is coupled to transmission line network 26 capacitively loads clock signal 18. When the total capacitance on any branch exceeds a fraction of a nanofarad, re-powering of the clock signal is required to avoid timing failures. As depicted, sub-circuit 14 is located on a branch of transmission line network 26 which is more heavily loaded with parasitic capacitance than the branch supplying sub-circuit 24.

An optimal clock signal transitions from high to low rapidly and predictably. Impedance converter 23 ensures that the parasitic loading on clock signal 18 by sub-circuits has minimal effect on the rise and fall time of the clock signal during transition.

Figure 2:
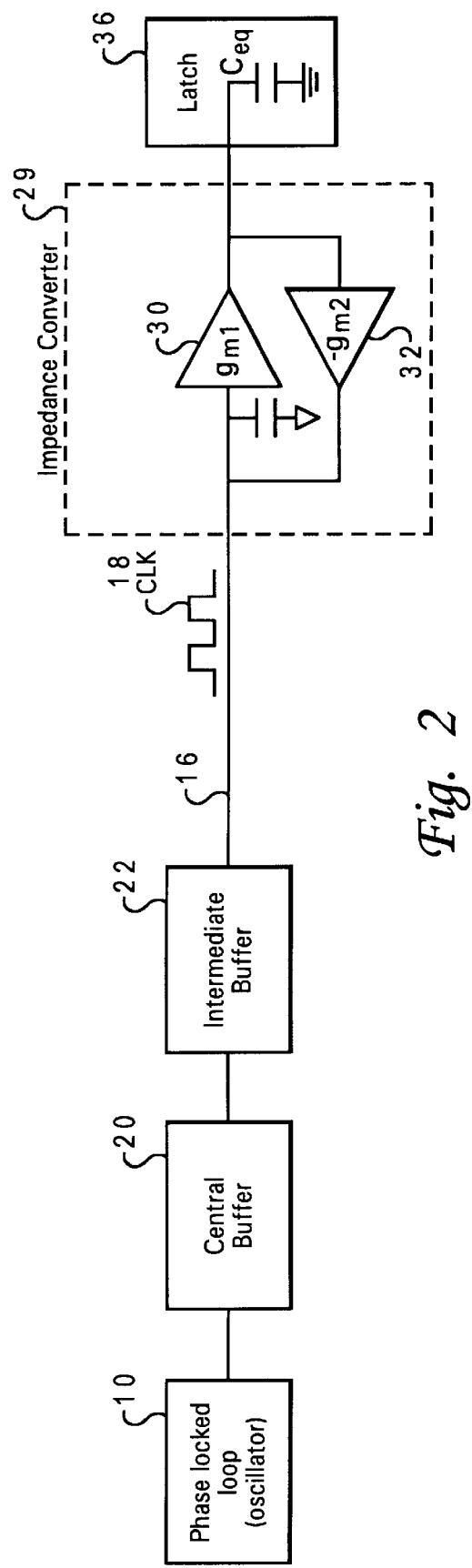
FIG. 2 depicts an impedance converter coupled between a latch and an intermediate buffer on a transmission line in accordance with the present invention.

Referring now to FIG. 2, impedance converter 29 is representative of one of impedance converters 23 of FIG. 1. Elements having identical reference numbers within FIG. 1 and FIG. 2 provide similar functions. Impedance converter 29 is depicted coupled to intermediate buffer 22, latch 36, central buffer 20 and phase locked loop 10 via transmission line 16. Impedance converter 29 performs as a load buffer. Impedance converters 29 are preferably placed on transmission line 16 at calculated intervals.

Optimum placement intervals for impedance converters or buffers within a clock distribution system are easily determined by current integrated circuit design tools. Computer aided buffer insertion tools utilize multiple parameters and variables to optimize buffer placement. Loading the electrical characteristics of impedance converter 29 into a computer data base would allow buffer insertion tools to effectively introduce impedance converters into an integrated circuit design. Variables considered by buffer insertion design tools include clock signal delay, attenuation and interference.

Impedance converter 29 is comprised of non-inverting amplifier 30 and inverting amplifier 32. Any standard CMOS amplifier configuration can be utilized to implemented impedance converter 29.

After an initial excitation on the input of non-inverting amplifier 30 with an acceptable frequency, impedance converter 29 will oscillate at the excitation frequency. An acceptable frequency would be a frequency in the range of frequencies which impedance converter oscillates with only negligible energy consumption or loading on the clock signal.

Impedance converter 29 is an unstable device and has a resonant frequency. If clock signal 18 is removed from the input of impedance converter 29, impedance converter 29 will continue to oscillate. The duration of the residual oscillations would depend on the amount of damping on the input and output of impedance converter 29. The supply voltage to impedance converter 29 can be gated by a control transistor (not shown). A control transistor could turn impedance converter 29 ON or OFF to control impedance converter's 29 activation.

The oscillation frequency of impedance converter 29 is self synchronizing to the clock signal frequency. At impedance converters' resonant frequency, minimal input energy will perpetuate oscillations. As the clock signal frequency deviates from the resonant frequency of impedance converter 29 the energy consumption of clock signal 10 by impedance converter 29 increases.

When the clock signal frequency deviates from the resonant frequency of impedance converter 29, impedance converter 29 degrades in efficiency and begins to clock signal energy and attenuate the clock signal. If the clock signal frequency is outside the 3 db resonant frequency range of impedance converter 29, the efficiency of impedance converter begins to rapidly degrade.

The natural frequency "$f_0$" of impedance converter 29 depends on the transconductances of non-inverting amplifier 30 and inverting amplifier 32 and the input and output end capacitances of impedance converter 29.

$$f_0 = (1/2\pi)((g_{m1}g_{m2})/(C_1 C_{eq}))^{1/2}$$

Where $g_{m1}$ and $g_{m2}$ are transconductances of non-inverting amplifier , $C_1$ is the input capacitance of the non-inverting amplifier 30 and inverting amplifier 32, and $C_{eq}$ is the capacitance of latch 36. The transconductances $g_{m1}$ and $g_{m2}$ can be tuned dynamically to match the natural frequency $f_0$ with the clock frequency.

It is advantageous to design an impedance converter having a resonant frequency close to the clock signal frequency. However, due to fabrication variations actual convergence of the clock signal frequency and the resonant frequency of impedance converter 29 is difficult to attain.

In a preferred embodiment, a single impedance converter design has been effectively implemented which can accommodate a clock signal frequency within the range from 700 Mhz and 1.3 Ghz.

Detailed analysis illustrates that impedance converter 29 converts the effective load capacitance $C_{eq}$ to a virtual inductance $L_{eq}$. The virtual inductance is connected in parallel with the input capacitance $C_1$ of non-inverting amplifier 30.

$$L_{eq} = (g_{m1} g_{m2})/C_{eq}$$

The virtual inductance $L_{eq}$ nulls the input capacitance of non-inverting amplifier 30 at the natural frequency $f_0$, and poses a very high impedance to transmission line 16. This significantly reduces the loading of an intermediate buffer. Concurrently, minimal loading allows an increase in the size of the transistors comprising non-inverting amplifier 30 without increasing the number of internal inverter stages.

The clock distribution system depicted in FIG. 2 produces a multitude of enhancements over the prior art. Typically, in the prior art load buffers must be large in size to accommodate the load. When an impedance converter is utilized as a buffer, a much smaller buffer will provide superior performance.

Additionally, traditional buffers can contribute to random jitter and skew of a clock signal. The present invention eliminates or greatly reduces the need for buffers due to the decrease in load capacitance on intermediate buffers. The present invention also is less susceptible to process variations. Parameters such as threshold voltage are not as critical for impedance converter 29 as they are in traditional buffers.

Impedance converter 29 does not resist an abrupt increase in the voltage of the rising edge of clock signal 18. Additionally, impedance converter 29 does not resist a sharp drop or voltage change in the trailing edge of clock signal 18 because it provides a low input capacitance. Allowing a sharp or abrupt transition of a clock signal reduces the delay associated with the slow rise fall times common in ordinary clock distribution systems.

In summary, the present invention provides a clock distribution system which can effectively distribute signals of over one gigahertz in frequency. In the present invention the terminations or loads on the transmission lines attain a low input capacitance. Impedance converters reduce the attenuation on a clock signal and boost the switching transition time due to their resonant phenomena.

While the invention has been particularly shown and described with reference to a preferred embodiment, it will be understood by those skilled in the art that various changes in form and detail may be made therein without departing from the spirit and scope of the invention.

What is claimed is:

1. A system for synchronizing high frequency sub-circuit operation within an integrated circuit:

at least one sub-circuit within an integrated circuit;

an oscillator within said integrated circuit for providing a clock signal, said clock signal having a selected frequency; and, a buffer within said integrated circuit coupled to said oscillator and said at least one sub-circuit, said buffer having a resonant circuit contained therein with a predefined bandwidth of resonant frequencies, such that said frequency of said clock signal is within said predefined bandwidth of said buffer, wherein said buffer oscillates at said frequency of said clock signal such that oscillation of said buffer can accomplish high frequency synchronization of sub-circuits within said system.

2. The system for synchronizing sub-circuit operation as in claim 1, wherein said buffer is implemented utilizing CMOS technology.

3. The system for synchronizing sub-circuit operation as in claim 1, wherein said buffer is comprised of a inverting amplifier and a non-inverting amplifier.

4. The system for synchronizing sub-circuit operation as in claim 1, wherein said sub-circuit is a digital data circuit.

5. The system for synchronizing sub-circuit operation as in claim 1, further comprising a central buffer coupled to said buffer and said oscillator.

6. The system for synchronizing sub-circuit operation as in claim 1, further comprising a plurality of intermediate buffers coupled to said buffer and said oscillator.

7. The system for synchronizing sub-circuit operation as in claim 1, wherein said oscillator is a phase locked loop.

8. The system for synchronizing sub-circuit operation of claim 1, wherein said clock signal has a frequency of approximately one gigahertz.

9. The system for synchronizing sub-circuit operation of claim 1, wherein said clock signal has a frequency of approximately two gigahertz.

10. A system for high frequency synchronization of sub-circuits within an integrated circuit, said system comprising:

an oscillator within an integrated circuit for providing a clock signal, said clock signal having a plurality of voltage transitions between a high level and a low level;

at least one sub-circuit within said integrated circuit possessing a capacitive load; and, at least one impedance converter having an input coupled to said oscillator and an output coupled to said capacitive load of said at least one sub-circuit, wherein said at least one impedance converter modifies said capacitive load of said at least one sub-circuit on said oscillator into a virtual inductive load such that said clock signal has a reduced opposition to voltage transitions between said high level and said low level, allowing said system to provide high frequency circuit synchronization of sub-circuits within said integrated circuit.

11. The system for high frequency synchronization as in claim 10, wherein said at least one impedance converter is implemented utilizing CMOS technology.

12. The system for high frequency synchronization as in claim 10, wherein said at least one impedance converter is comprised of a inverting amplifier and a non-inverting amplifier.

13. The system for high frequency synchronization as in claim 10, wherein said at least one sub-circuit is a digital data circuit.

14. The system for high frequency synchronization as in claim 10, further comprising a central buffer coupled to said impedance converter and said oscillator.

15. The system for high frequency synchronization as in claim 10, further comprising a plurality of intermediate buffers coupled to said impedance converter and said oscillator.

16. The system for high frequency synchronization as in claim 10, wherein said oscillator is a phase locked loop.

* * * * *